(12) United States Patent
Wang et al.

(10) Patent No.: US 8,331,509 B2
(45) Date of Patent: Dec. 11, 2012

(54) METHOD AND DEVICE FOR CANCELLING TRANSMITTER INTERFERENCE IN TRANSCEIVER, AND TRANSCEIVER

(75) Inventors: Wei Wang, Shanghai (CN); Tao Pu, Shanghai (CN); Jiefeng Deng, Shanghai (CN); Siqing Ye, Bridgewater, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/112,562

(22) Filed: May 20, 2011

(65) Prior Publication Data

US 2011/0228828 A1  Sep. 22, 2011

Related U.S. Application Data

(63) Continuation of application No. PCT/CN2009/072547, filed on Jun. 30, 2009.

(30) Foreign Application Priority Data

Nov. 21, 2008 (CN) .......................... 2008 1 0177091

(51) Int. Cl.
*H03D 1/04* (2006.01)

(52) U.S. Cl. ........ 375/346; 375/219; 375/260; 375/316; 375/340; 375/350; 455/63.1; 455/67.13; 455/73; 455/114.2; 455/296; 455/501; 370/272; 370/273; 370/276; 370/297; 370/335; 370/342; 327/551

(58) Field of Classification Search .................. 375/219, 375/260, 316, 340, 346, 350; 455/73, 63.1, 455/67.13, 114.2, 296, 501; 370/272, 273, 370/276, 297, 335, 342; 327/551
See application file for complete search history.

(56) References Cited

U.S. PATENT DOCUMENTS

| 2001/0040932 | A1 | 11/2001 | Lindquist et al. |
| 2002/0193071 | A1 | 12/2002 | Walthro |
| 2004/0151238 | A1 | 8/2004 | Masenten |
| 2005/0107051 | A1 | 5/2005 | Aparin |
| 2005/0286665 | A1 | 12/2005 | Resheff et al. |
| 2008/0039045 | A1* | 2/2008 | Filipovic et al. .............. 455/295 |

(Continued)

FOREIGN PATENT DOCUMENTS

CN  1413387 A  4/2003

(Continued)

OTHER PUBLICATIONS

English Translated Written Opinion of the International Searching Authority for PCT/CN2009/072547, dated (mailed) Oct. 15, 2009, Huawei Technologies Co., Ltd. (5 pgs.).
International Search Report for International Application No. PCT/CN2009/072547, dated (mailed) Oct. 15, 2009, Huawei Technologies Co., Ltd. (4 pgs.).
First Chinese Office Action of Chinese application No. 200810177091.0 Mailed Sep. 2, 2011.

(Continued)

*Primary Examiner* — Leon Flores
(74) *Attorney, Agent, or Firm* — Conley Rose, P.C.; Grant Rodolph

(57) ABSTRACT

A method and a device for cancelling transmitter interference in a transceiver, and a transceiver are provided. The method includes: coupling a part of radio frequency signals output from a transmitter, performing amplification, frequency conversion, analog-digital conversion, and digital filtration on the coupled signal by an interference receiver, and outputting a digital signal; performing adaptive equalization on the digital signal output from the interference receiver, and delaying predetermined time of the digital signal output from a receiver, and subtracting the equalized digital signal from the delayed digital signal.

9 Claims, 5 Drawing Sheets

U.S. PATENT DOCUMENTS

2008/0089397 A1* 4/2008 Vetter et al. .................. 375/220
2010/0048146 A1* 2/2010 McCallister .................. 455/78

FOREIGN PATENT DOCUMENTS

| CN | 1513231 A | 7/2004 |
| CN | 101010883 A | 8/2007 |
| CN | 101420246 A | 4/2009 |
| WO | WO2008/094259 A1 | 8/2008 |
| WO | WO2008/133443 A1 | 11/2008 |
| WO | WO 2010/057384 A1 | 5/2010 |

OTHER PUBLICATIONS

Extended European Search Report issued in EP 09827133.1 mailed Nov. 16, 2011.
Foreign communication from a counterpart application, Chinese application 20081017791.0, Office Action dated Aug. 3, 2012, 5 pages.
Foreign communication from a counterpart application, Chinese application 20081017791.0, Partial English Translation Office Action dated Aug. 3, 2012, 7 pages.

* cited by examiner

METHOD AND DEVICE FOR CANCELLING TRANSMITTER INTERFERENCE IN TRANSCEIVER, AND TRANSCEIVER

CROSS-REFERENCE TO RELATED APPLICATIONS

This application is a continuation of International Application No. PCT/CN2009/072547, filed on Jun. 30, 2009, which claims priority to Chinese Patent Application No. 200810177091.0, filed on Nov. 21, 2008, both of which are hereby incorporated by reference in their entireties.

FIELD OF THE INVENTION

The present invention relates to the field of communication technologies, and in particular, to a method and a device for cancelling transmitter interference in a transceiver, and a transceiver.

BACKGROUND OF THE INVENTION

A transceiver is an important part in a wireless communication system, and has a structure including a transmitter 101, a receiver 102, a duplexer 103, and an antenna 104, as shown in FIG. 1.

The transmitter 101 receives a baseband signal from a baseband sub-system, performs digital interpolation and filtration on the baseband signal, converts the digital signal into an analog signal, and amplifies the analog signal to a power required in a wireless space. The analog signal is transmitted to the wireless space through the duplexer 103 and the antenna 104.

Similarly, the receiver 102 receives a signal from the wireless space through the antenna 105 and the duplexer 103, converts the received signal into a baseband signal, and sends the baseband signal to the baseband sub-system.

For the receiver 102, the analog signal transmitted from the transmitter 101 is mainly an interference signal. As isolation of the duplexer 103 is not sufficient enough, the interference signal is leaked through the duplexer 103 to an input end of the receiver 102. FIG. 2 is a structural view of cancelling transmitter interference by a transceiver in the prior art.

An amplitude phase adjustment unit 113 couples a part of output signals from the transmitter 101. An amplitude phase adjustment control unit 112 controls the amplitude phase adjustment unit 113 to perform amplitude phase adjustment on the coupled output signal. The amplitude phase adjustment unit 113 sends the signal after the amplitude phase adjustment to the input end of the receiver 102, to cancel the interference signal leaked through the duplexer 103 to the receiver 102.

However, amplitude phase adjustment is a complex number multiplication operation performed on the analog signal. If an in-band amplitude phase property is not flat, for example, an in-band gain is not flat or a group delay is not flat, an operation that is more complicated than the complex number multiplication operation is required for performing the amplitude phase adjustment. The phase adjustment unit 113 in the prior art can only perform amplitude phase adjustment through complex number multiplication, and thus the amplitude phase adjustment in the prior art cannot effectively perform the interference cancelling.

SUMMARY OF THE INVENTION

Embodiments of the present invention provide a method and a device for cancelling transmitter interference in a transceiver, and a transceiver, so as to effectively cancel an interference signal of a transmitter for a receiver.

An embodiment of the present invention provides a method for cancelling transmitter interference in a transceiver, where the method includes: coupling a part of radio frequency signals output from a transmitter, processing, by an interference receiver, the coupled signals, and outputting a digital signal; and performing interference cancelling on the digital signal output from the interference receiver and a digital signal output from a receiver.

An embodiment of the present invention provides a device for cancelling transmitter interference in a transceiver, where the device includes an interference receiver and an interference cancelling unit, where the interference receiver is configured to couple a part of radio frequency signals from an output end of a transmitter, process the radio frequency signals, and output a digital signal; and the interference cancelling unit is configured to perform interference cancelling on the digital signal output from the interference receiver and a digital signal output from a receiver.

An embodiment of the present invention provides a transceiver, where the transceiver includes a transmitter and a receiver, and further includes an interference receiver and an interference cancelling unit, where the interference receiver is configured to couple a part of radio frequency signals from an output end of the transmitter, process the radio frequency signals, and output a digital signal, and the interference cancelling unit is configured to perform interference cancelling on the digital signal output from the interference receiver and a digital signal output from a receiver.

In the present invention, interference cancelling is performed on a digital signal, and the interference cancelling is performed in a digital domain, so that a more complicated amplitude phase adjustment is implemented, so as to effectively perform interference cancelling in case that an in-band amplitude phase property is not flat.

DETAILED DESCRIPTION OF THE EMBODIMENTS

The embodiments of the present invention are described in detail with reference to the accompanying drawings.

Embodiment 1 of the Method

Figure 1:
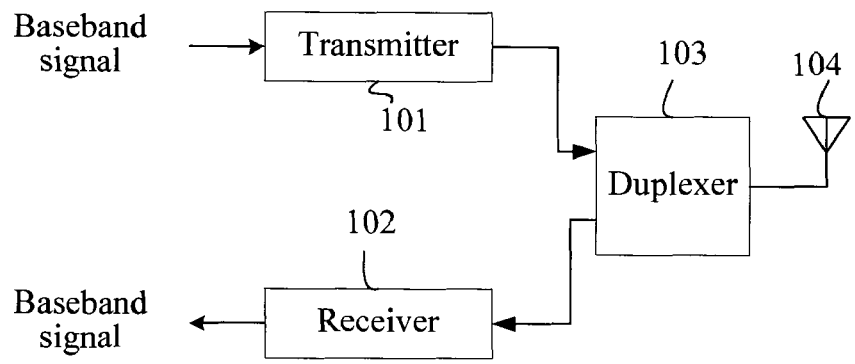
FIG. 1 is a structural view of a transceiver in the prior art.
Figure 2:
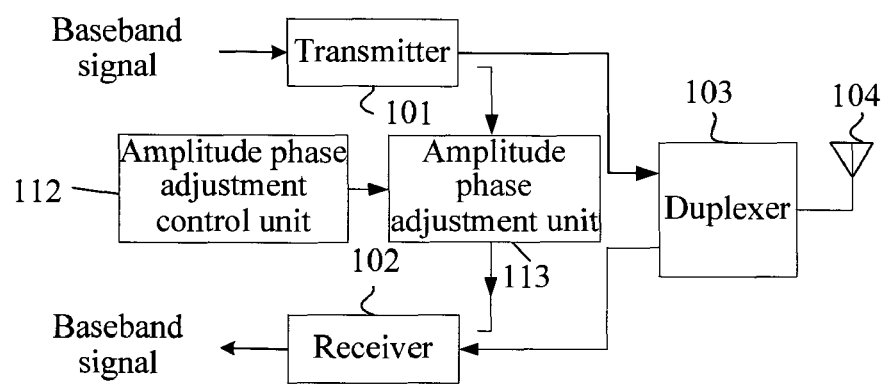
FIG. 2 is a structural view of cancelling transmitter interference by a transceiver in the prior art.
Figure 3:
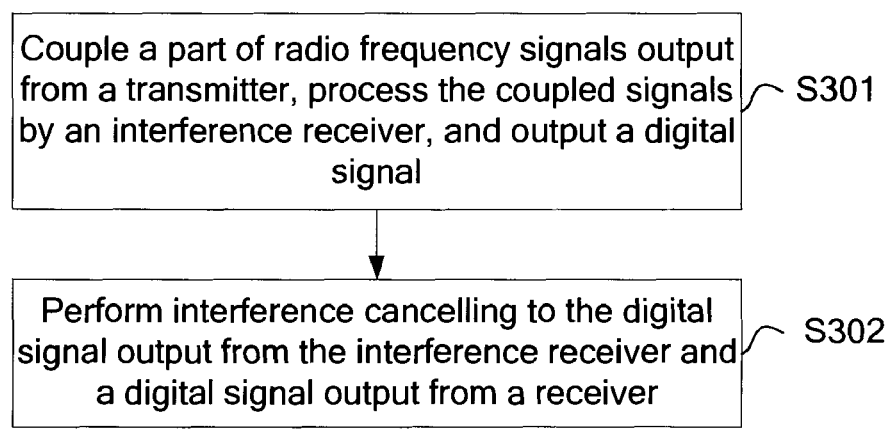
FIG. 3 is a flow chart of Embodiment 1 of a method according to the present invention.

FIG. 3 is a flow chart of Embodiment 1 of a method according to the present invention.

In step S301, a part of radio frequency signals output from a transmitter are coupled, and processed by an interference receiver, and a digital signal is output.

It should be noted that a part of the radio frequency signals may be coupled through a segment of parallel transmission line, and a coupling factor is generally 20 dB to 50 dB, that is, a power of the coupled signal is $1/100$ to $1/100000$ of a total power.

In step S302, interference cancelling is performed on the digital signal output from the interference receiver and a digital signal output from a receiver.

In the method for cancelling transmitter interference in the transceiver according to the present invention, the interference cancelling is performed on the digital signal, which is different from the prior art in which the interference cancelling is performed on an analog signal. The method for cancelling transmitter interference in the transceiver according to the present invention may be set according to the difference of frequency. In this way, effective interference cancelling can be performed when the production batches of base stations are not identical, and the product is aged. In the present invention, not only a complex number multiplication operation, but furthermore in-band equalization is performed on the radio frequency signal. In this case, if the in-band amplitude phase property is not flat, for example, the in-band gain is not flat or the in-band group delay is not flat, a time domain method such as Finite Impulse Response (FIR) or Infinite Impulse Response (IIR) filtration, or a frequency domain method of Fast Fourier Transform (FFT), frequency domain amplitude phase weighting, and Inverse Fast Fourier Transform (IFFT) in combination may be employed to implement more complicated amplitude phase adjustment, so as to effectively perform interference cancelling.

In addition, the method for cancelling transmitter interference in the transceiver according to the present invention effectively cancels the interference signal, and thus the transceiver isolation requirement for the duplexer may be lowered at the same transceiver isolation requirement, thereby decreasing the production cost of the duplexer.

It should be noted that the method for cancelling transmitter interference in the transceiver according to the present invention may be applied in the field of wireless communication technologies, such as a mobile communication system, fixed wireless access, wireless data transmission, radar, or other systems.

Embodiment 2 of the Method

Figure 4:
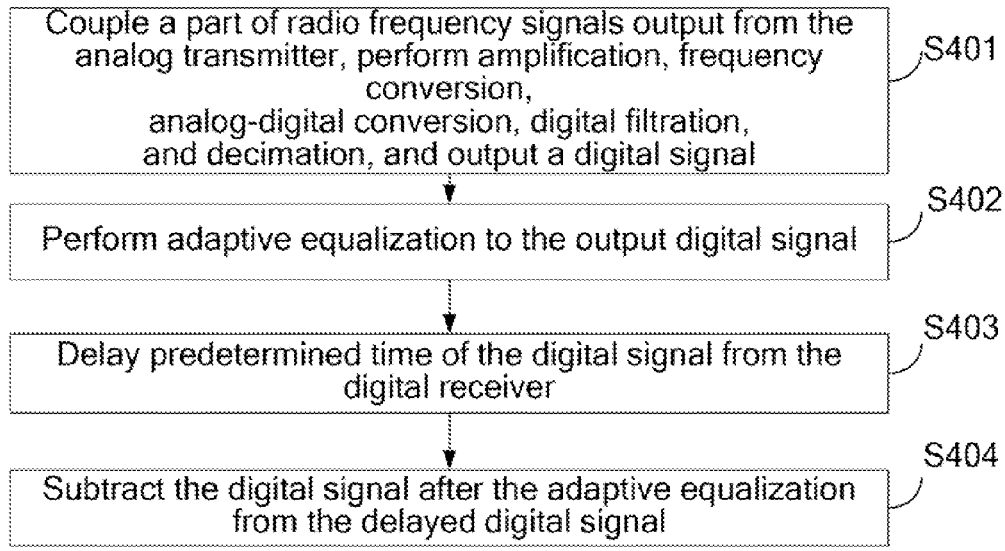
FIG. 4 is a flow chart of Embodiment 2 of a method according to the present invention.

FIG. 4 is a flow chart of Embodiment 2 of a method according to the present invention.

It should be noted that a transmitter in Embodiment 2 of the Method includes a digital transmitter, a Digital-Analog Converter (DAC), and an analog transmitter. A receiver includes an analog receiver, an Analog-Digital Converter (ADC), and a digital receiver.

In step S401, a part of a radio frequency signals output from the analog transmitter are coupled, amplification, frequency conversion, analog-digital conversion, digital filtration, and decimation are performed, and a digital signal is output.

It should be noted that a part of the radio frequency signals may be coupled through a segment of parallel transmission line, and a coupling factor is generally 20 dB to 50 dB, that is, the power of the coupled radio frequency signal is $1/100$ to $1/100000$ of the total power of the radio frequency signal output from the analog transmitter.

First, the coupled radio frequency signal is amplified and frequency converted to a low frequency, and then the low-frequency analog signal is converted into a digital signal. Finally, the digital filtration and the decimation are performed on the digital signal, so as to convert the digital signal into a digital signal at low pass rate.

It should be noted that, in some cases, the frequency conversion, the digital filtration, or the decimation needs, not to be performed on the signal coupled from an output end of the analog transmitter.

In step S402, adaptive equalization is performed on the output digital signal.

It should be noted that the adaptive equalization may be implemented in a time domain, or a frequency domain.

When the adaptive equalization is implemented in the time domain, FIR or IIR is used for filtration.

When the adaptive equalization is implemented in the frequency domain, a method of FFT, frequency domain amplitude phase weighting, and IFFT in combination is used for filtration.

Complicated amplitude phase adjustment can be implemented through both the time domain equalization and the frequency domain equalization. The adaptive equalization may employ Lease Mean Square (LMS), Least Square (LS), Recursive Least Square (RLS), or other adaptive equalization algorithms, regardless of the time domain equalization or the frequency domain equalization.

In step S403, predetermined time of the digital signal from the digital receiver is delayed.

The delay is configured to compensate an average delay difference between the digital signal after the adaptive equalization and the digital signal from the digital receiver. The average delay difference is frequency domain average. Differences at different frequency points are achieved through the adaptive equalization.

In step S404, the digital signal after the adaptive equalization is subtracted from the delayed digital signal.

The performing the interference cancelling on the digital signal output from the interference receiver and the digital signal output from the receiver is specifically implemented through steps S402 to S404. Interference cancelling may be implemented by using a method according to a practical demand.

It should be noted that, in some special cases, the predetermined time of the digital signal from the digital receiver does not need to be delayed, that is, the predetermined time is 0.

In an ideal case, the interference signal is completely cancel. A differential signal after the subtracting does not include the interference signal.

It should be noted that, the frequency band of the signal coupled from the analog transmitter may be equivalent to that of the signal received by the analog receiver.

Embodiment 3 of the Method

Figure 5:
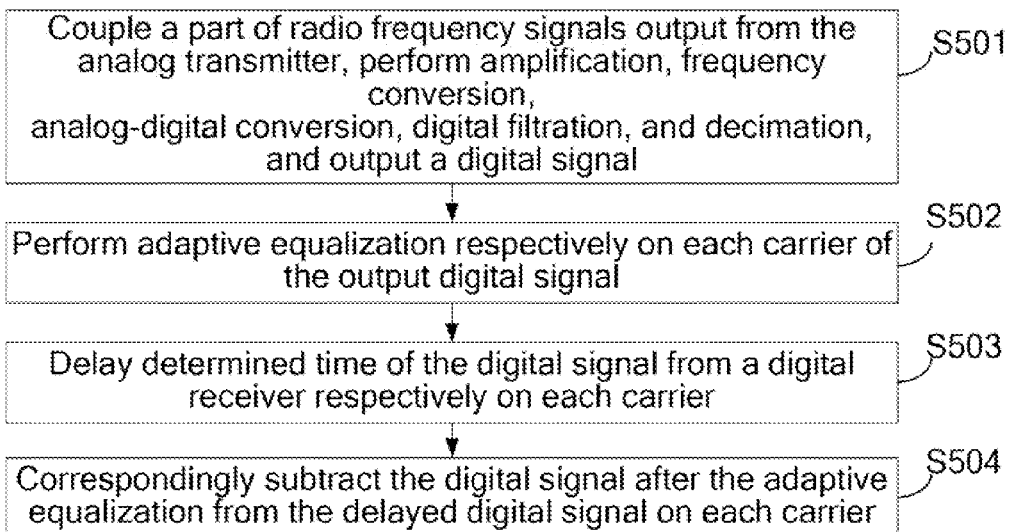
FIG. 5 is a flow chart of Embodiment 3 of a method according to the present invention.

FIG. 5 is a flow chart of Embodiment 3 of a method according to the present invention.

It should be noted that Embodiment 3 of the method differs from Embodiment 2 of the method in that Embodiment 3 of the method is a method for cancelling interference of a multi-carrier radio frequency signal. The method for cancelling interference of a multi-carrier radio frequency signal is described below by taking a Wideband Code Division Multiple Access (WCDMA) multi-carrier system as an example. For example, 20 MHz bandwidth of a receiving channel in WCDMA system includes 4 WCDMA carriers of 5 MHz.

For a multi-carrier receiver, adaptive equalization may be performed on combined multi-carrier, through, the same method as that in Embodiment 2 of the method; or performed respectively on each carrier. A method for implementing adaptive equalization respectively on each carrier is briefly described through Embodiment 3 of the method.

Step S501 is the same as step S401, and is not repeated here again.

A part of radio frequency signals output from an analog transmitter are coupled, and amplification, frequency conversion, analog-digital conversion, digital filtration, and decimation are performed.

It should be noted that, in some cases, the frequency conversion, the digital filtration, or the decimation needs not to be performed on the signals coupled from an output end of the analog transmitter.

In step S502, adaptive equalization is performed on the output digital signal on each carrier.

In step S503, determined time of the digital signal from a digital receiver is delayed on each carrier.

In step S504, the digital signal after the adaptive equalization is correspondingly subtracted from the delayed digital signal on each carrier.

The specific implementation principle of the multi-carrier interference cancelling method as described in Embodiment 3 of the method is the same as that of the method as described in Embodiment 2, and is not repeated here again.

In an embodiment, the present invention provides a device for cancelling transmitter interference in a transceiver.

Figure 6:
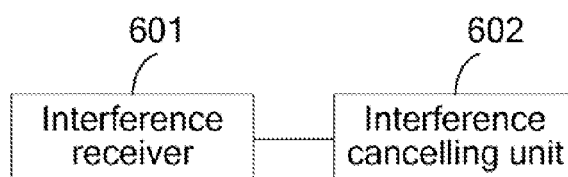
FIG. 6 is a schematic view of Embodiment 1 of a device for cancelling transmitter interference in a transceiver according to the present invention.

Embodiment 1 of the Device for Cancelling Transmitter Interference in the Transceiver FIG. 6 is a schematic view of Embodiment 1 of a device according to the present invention.

The device for cancelling transmitter interference in the transceiver includes an interference receiver 601 and an interference cancelling unit 602.

The interference receiver 601 is configured to couple a part of radio frequency signals from an output end of a transmitter, process the radio frequency signals, and output a digital signal.

It should be noted that a part of the radio frequency signals may be coupled through a segment of parallel transmission line, and a coupling factor is generally 20 dB to 50 dB, that is, the power of the coupled signal is 1/100 to 1/100000 of the total power of the radio frequency signal output, from an analog transmitter.

The interference cancelling unit 602 is configured to perform interference cancelling on the digital signal output from the interference receiver 601 and a digital signal output from the receiver 102.

Figure 7:
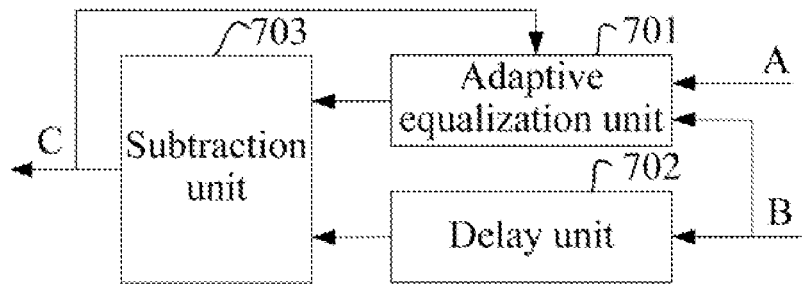
FIG. 7 is a structural view of an interference cancelling unit according to the present invention.

FIG. 7 is a structural view of the interference cancelling unit 602.

The interference cancelling unit 602 includes an adaptive equalization unit 701, a delay unit 702, and a subtraction unit 703.

The adaptive equalization unit 701 is configured to perform adaptive equalization on a digital signal A output from the interference receiver, and send the digital signal A to the subtraction unit 703.

The delay unit 702 is configured to delay predetermined time of a digital signal B output from the receiver, and send the digital signal B to the subtraction unit 703.

The subtraction unit 703 is configured to subtract the digital signal after the adaptive equalization from the delayed digital signal, and output a digital signal C.

It should be noted that when interference cancelling is performed on a multi-carrier signal, adaptive equalization may be performed on a combined multi-carrier, that is, only one adaptive equalization unit 701 is needed; or the adaptive equalization is performed respectively on each carrier. When the adaptive equalization is performed respectively on each carrier, N carriers correspond to N adaptive equalization units 701. Definitely, N adaptive equalization units 701 respectively correspond to N delay units 702 and N subtraction units 703 (where N is an integer greater than or equal to 1). Each carrier signal is respectively subtracted in the corresponding subtraction unit 703.

The interference receiver 601 and the receiver may employ the same frequency mixing structure and the same frequency mixing local oscillation.

In the device for cancelling transmitter interference in the transceiver according to the present invention, interference cancelling is performed on the digital signal, which is different from the prior art in which the interference cancelling is performed on an analog signal. The present invention may be optionally set according to the difference of frequency. Therefore, effective interference cancelling may be performed when the product lot of a base station is not identical, and the product is aged. In the present invention, not only a complex number multiplication operation, but also in-band equalization is performed on the radio frequency signal. In this case, if the in-band amplitude phase property is not flat, for example, the in-band gain is not flat or the in-band group delay is not flat, a time domain method such as FIR or IIR filtration, or a frequency domain method of FFT, frequency domain amplitude phase weighting and IFFT in combination may be employed to implement more complicated amplitude phase adjustment, so as to effectively perform interference cancelling.

In addition, interference signal is effectively cancel in the present invention, and thus the transceiver isolation requirement for the duplexer may be lowered at the same transceiver isolation requirement, thereby decreasing the production cost of the duplexer.

Figure 8:
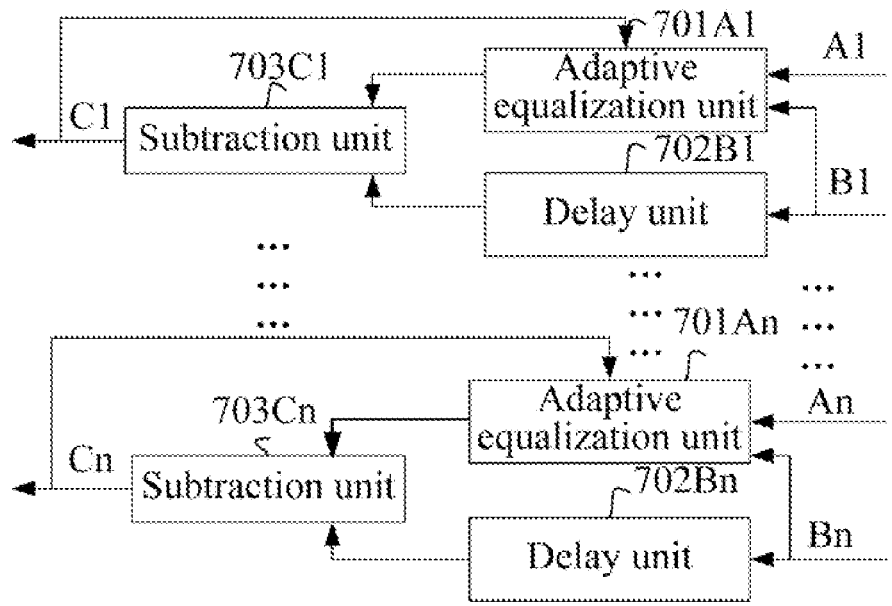
FIG. 8 is another structural view of an interference cancelling unit according to the present invention.

Embodiment 2 of the Device for Cancelling Transmitter Interference in the Transceiver Being different from Embodiment 1 of the device for cancelling transmitter interference in the transceiver, Embodiment 2 of the device for cancelling transmitter interference in the transceiver is applied in a multi-carrier scenario, the interference receiver is a multi-carrier interference receiver, and correspondingly, a structure of the interference cancelling unit 602 is as shown in FIG. 8.

A process for cancelling interference of multi-carrier signal is described by taking n carriers as an example, where A1 to An are multi-carrier digital signals from the interference receiver, and B1 to Bn are multi-carrier digital signals from the receiver.

Description is made by taking a first carrier frequency, signal as an example.

An adaptive equalization unit 701A1 performs amplitude phase adjustment on the A1 path of the digital signal with the B1 path the digital signal as a reference, so as to enable the two, paths of signals to have the same amplitude and phase.

Predetermined time of the B1 path of the digital signal is delayed by a delay unit 702B1, and then the B1 path of the digital signal is sent to a subtraction unit 703C1. The subtraction unit 703C1 subtracts the digital signal after the adaptive equalization from the delayed digital signal, so as to cancel interference signal.

It should be noted that a; baseband signal C1 output from the subtraction unit 703C1 is fed back to the adaptive equalization unit 701A1, for adjusting an equalization coefficient of the adaptive equalization unit 701A1.

Similarly, an adaptive equalization unit 701An, a delay unit 702Bn, and a subtraction unit 703Cn respectively perform adaptive equalization, delay, and subtraction on an $n^{th}$ path of carrier.

It should be noted that the interference cancelling device according to the embodiment of the present invention can be applied in the field of wireless communication technologies, such as a mobile communication system, fixed wireless access, wireless data transmission, radar, or other systems.

In an embodiment, the present invention provides a transceiver.

Embodiment 1 of the Transceiver

Figure 9:
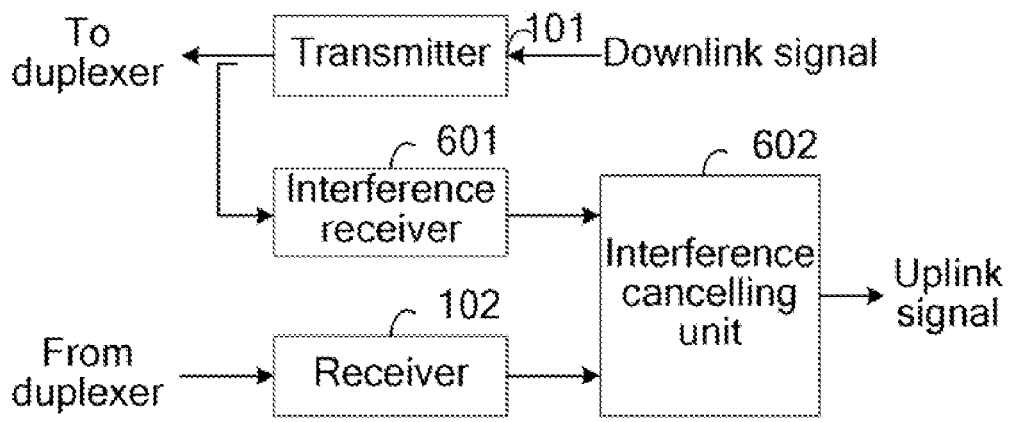
FIG. 9 is a structural view of Embodiment 1 of a transceiver according to the present invention.

FIG. 9 is a structural view of Embodiment 1 of a transceiver according to the present invention.

The transceiver according to the embodiment of the present invention includes a transmitter 101 and a receiver 102, and further includes an interference receiver 601 and an interference cancelling unit 602.

The interference receiver 601 is configured to couple a part of radio frequency signals from an output end of the transmitter 101, process the radio frequency signals, and output a digital signal.

It should be noted that a part of the radio frequency signals may be coupled through a segment of parallel transmission line, and a coupling, factor is generally 20 dB to 50 dB, that is, the power of the coupled signal is $1/100$ to $1/100000$ of the total power of the radio frequency signal output from an analog transmitter.

The interference cancelling unit 602 is configured to perform interference cancelling on the digital signal output from the interference receiver 601 and a digital signal output from the receiver 102.

The interference receiver and the receiver may employ the same frequency mixing structure and the same frequency mixing local oscillation.

Interference signal is effectively cancel by the transceiver in the present invention, and thus the transceiver isolation requirement for the duplexer may be lowered at the same transceiver isolation requirement, thereby decreasing the production cost of the duplexer.

It should be noted that the transceiver according to the present invention can be applied in the field of wireless communication technologies, such as a mobile communication system, fixed wireless access, wireless data transmission, radar, or other systems.

Embodiment 2 of the Transceiver

Figure 10:
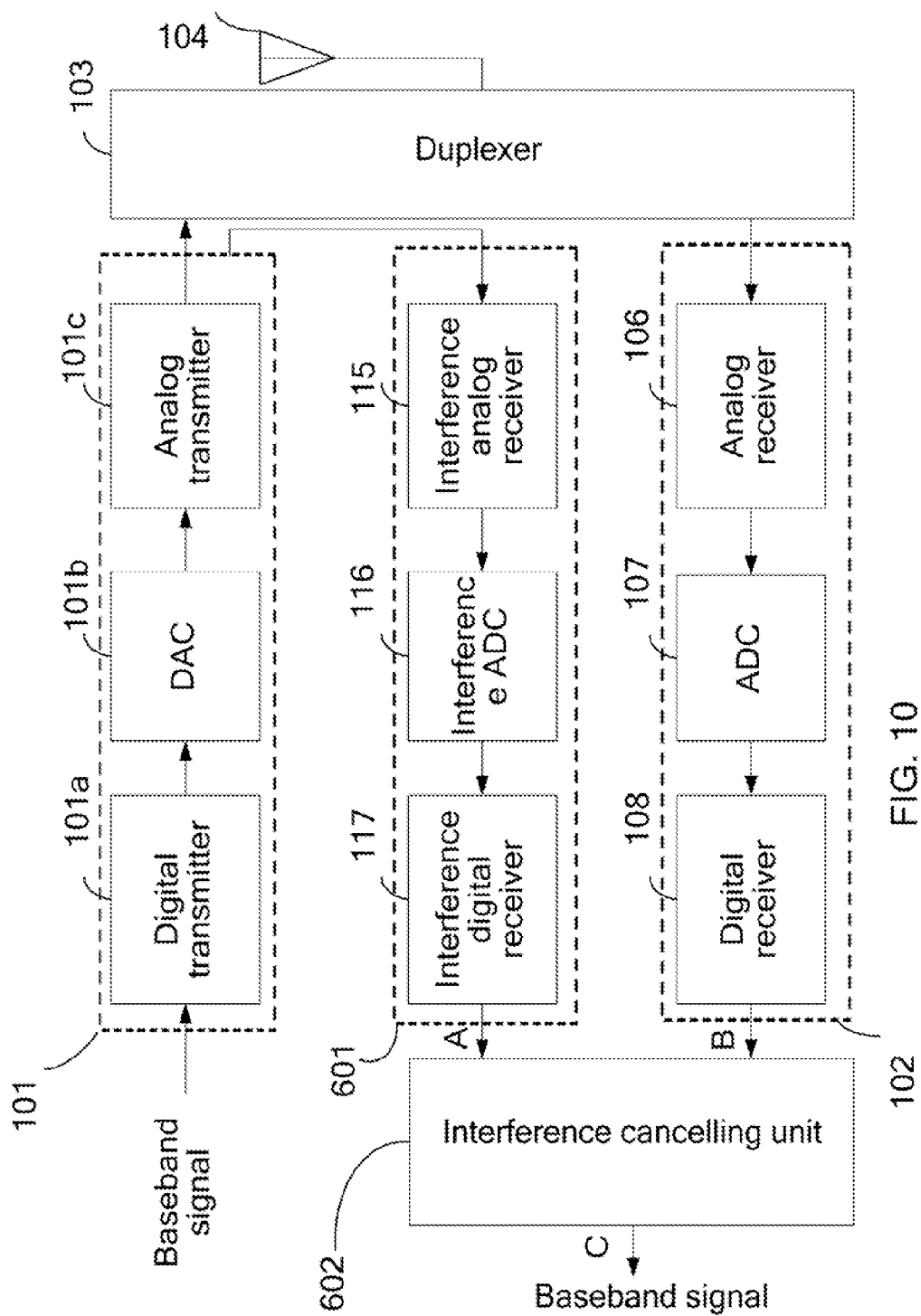
FIG. 10 is a structural view of Embodiment 2 of a transceiver according to the present invention.

FIG. 10 is a structural view of Embodiment 2 of a transceiver according to the present invention.

In this embodiment, a transmitter 101 includes a digital transmitter 101a, a DAC 101b, and an analog transmitter 101c. A receiver 102 includes an analog receiver 106, an ADC 107, and a digital receiver 108. An interference receiver 601 includes an interference analog receiver 115, an interference ADC 116, and an interference digital receiver 117.

The interference analog receiver 115 is configured to couple a part of radio frequency signals from an output end of the analog transmitter, perform amplification and frequency conversion, and send the radio frequency signals to the interference ADC 116.

The interference ADC 116 is configured to convert the received analog signal into a digital signal, and send the digital signal to the interference digital receiver 117.

The interference digital receiver 117 is configured to perform digital filtration and decimation on the digital signal, and send the digital signal to the interference cancelling unit 602.

It should be noted that, in some cases, the frequency conversion, the digital filtration, or the decimation needs not to be performed on the signal coupled from an output end of the analog transmitter.

The interference cancelling unit 602 is configured to cancel a signal B from the digital receiver 108 and an interference signal A in the interference digital receiver 117. A digital signal C output after the cancelling includes no interference signal or a low interference signal.

It should be noted that the inner structure of the interference cancelling unit 602 according to Embodiment 2 of the transceiver is the same as that in FIG. 7 of the embodiment of the device.

It should be noted that the frequency band of the signal received by the interference analog receiver 115, the interference ADC 116, and the interference digital receiver 117 is the same as that of the signal received by the analog receiver 106, the ADC 107, and the digital receiver 108.

Gains of the interference analog receiver 115 and the analog receiver 106 are generally not the same, because strength of the signal received by the interference analog receiver 115 is generally much higher than that of the signal received by the analog receiver 106.

The interference analog receiver 115, the interference ADC 116, and the interference digital receiver 117, and the analog receiver 106, the ADC 107, and the digital receiver 108 may use the same frequency mixing structure and the same frequency mixing local oscillation, so as to better improve an interference cancelling effect. Herein, the same frequency mixing local oscillation refers to that the frequency mixing local oscillation is originated from the same Voltage Controlled Oscillator (VCO), and then split into two paths.

In the system according to the embodiment of the present invention, interference, cancelling is performed on the digital signal, which is different from the prior art in which the interference cancelling is performed on the analog signal in the analog receiver 106.

Embodiment 3 of the Transceiver

Figure 11:
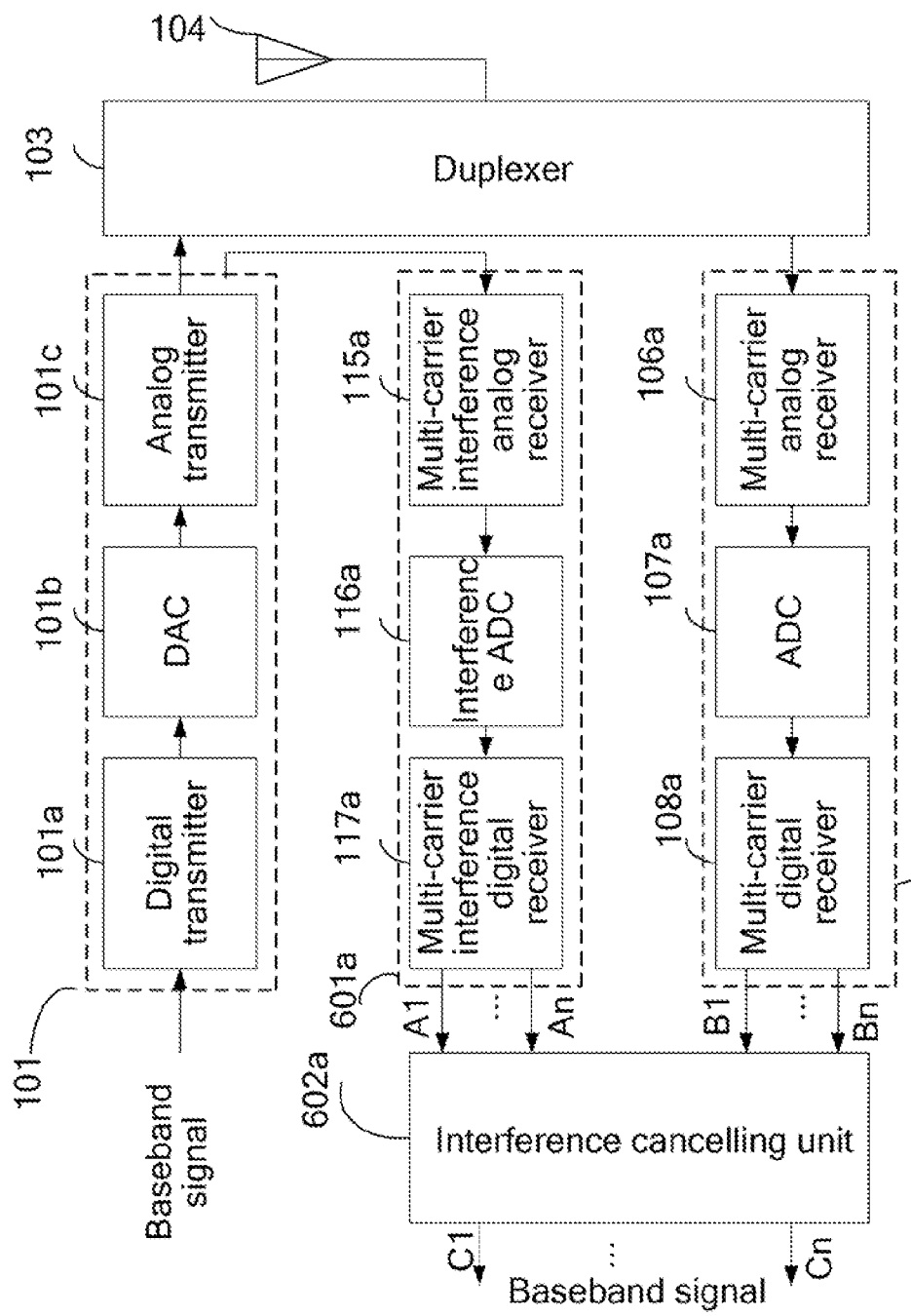
FIG. 11 is a structural view of Embodiment 3 of a transceiver according to the present invention.

FIG. 11 is a structural view of Embodiment 3 of a system according to the present invention.

Embodiment 3 of the system is different from Embodiment 2 of the system that the receiver 102a and the interference receiver 601a are multi-carrier receivers, where the receiver 102a includes a multi-carrier analog receiver 106a, a multi-carrier digital receiver 108a, and an ADC 107a, and the interference receiver 601a includes a multi-carrier interference analog receiver 115a, an interference ADC 116a, and a multi-carrier interference digital receiver 117a. When a signal received by the receiver is a multi-carrier, interference cancelling may be performed respectively on signal of each carrier. Definitely, interference cancelling may also be performed on a combined multi-carrier through the system of Embodiment 1 of the system.

The carriers in the multi-carrier are corresponding to the adaptive equalization units, the delay units, and the subtraction units. That is, the number of the adaptive equalization units, the number of the delay units, and the number of the subtraction units are corresponding to the number of the carriers. Each carrier is corresponding to a set of interference processing, system.

As shown in FIG. 11, A1 to An represent interference baseband signals corresponding to n paths of carriers output from the multi-carrier interference digital receiver 117a. B1 to Bn represent baseband signals corresponding to n paths of carriers output from the multi-carrier digital receiver 108a. C1 to Cn represent baseband signals corresponding to n paths of carriers output from the subtraction unit.

Specific inner structure of the interference cancelling unit 602a is the same as that in Embodiment 2 of the device according to the embodiment of the present invention, as shown in FIG. 8.

It should be noted that the multi-carrier signals A1 to An are combined into a baseband signal A, the multi-carrier signals B1 to Bn are combined into a baseband signal B, and then the cancel interference is performed on the combined multi-carrier by using the interference cancelling unit as shown in FIG. 7.

Those of ordinary skill in the art should understand that all or a part of the steps of the method according to the embodiments of the present invention may be implemented by a program instructing relevant hardware. The program may be stored, in a computer readable storage medium. When the program is run, the contents of the communication method according to the embodiments of the present invention are performed. The storage medium may be such as a ROM/RAM, a magnetic disk, and an optical disk.

To sum up, in the method for cancelling transmitter interference in the transceiver according to the embodiment of the present invention, the interference cancelling is performed on the digital signal. As the interference cancelling is implemented in the digital domain, more complicated amplitude phase adjustment may be achieved, and effective interference cancelling can be performed when the in-band amplitude phase property is not flat.

Those of ordinary skill in the art should understand that all or a part of the steps of the method according to the embodiments of the present invention may be implemented by a program instructing relevant hardware. The program may be stored in a computer readable storage medium. When the program is run, the following steps are performed: coupling a part of radio frequency signals output from a transmitter, processing, by an interference receiver, the radio frequency signals and outputting a digital signal; and performing interference cancelling on the digital signal output from the interference receiver and a digital signal output from a receiver.

What is claimed is:

1. A method for cancelling transmitter interference in a transceiver, comprising:
receiving, by an interference receiver, a part of radio frequency signal output from a transmitter, processing the received signals, and outputting a digital signal;
performing an adaptive equalization in a time domain or in a frequency domain on the digital signal output from the interference receiver;
delaying for a predetermined time of the digital signal output from a receiver; and
subtracting the adaptive equalized digital signal from the delayed digital signal,
wherein a Finite Impulse Response (FIR) or an Infinite Impulse Response (IIR) is used for filtration when the adaptive equalization is performed in the time domain, and
wherein a Fast Fourier Transform (FFT), a frequency domain amplitude phase weighting, and an Inverse Fast Fourier Transform (IFFT) are used for filtration when the adaptive equalization is performed in the frequency domain.

2. The method according to claim 1, wherein processing the received signals comprises performing an amplification, an analog-digital conversion, and at least one of a frequency conversion, a digital filtration, and a decimation on the received signal.

3. The method according to claim 1, wherein the adaptive equalization is performed on a combined multi-carrier or on each carrier when the receiver and the interference receiver are multi-carrier receivers.

4. The method according to claim 1, wherein receiving the part of the radio frequency signal output from the transmitter comprises receiving $1/100$ to $1/100,000$ of a total power of the radio frequency signal output from the transmitter.

5. A transceiver, comprising:
a transmitter;
a receiver;
an interference receiver; and
an interference cancelling unit,
wherein the interference receiver is configured to receive a part of radio frequency signal from an output end of the transmitter, process the received radio frequency signals, and output a digital signal,
wherein the interference cancelling unit is configured to perform an adaptive equalization in a time domain or in a frequency domain on the digital signal output from the interference receiver, delay for a predetermined time of the digital signal output from the receiver, and subtract the adaptive equalized digital signal from the delayed digital signal,
wherein a Finite Impulse Response (FIR) or an Infinite Impulse Response (IIR) is used for filtration when the adaptive equalization is performed in the time domain, and
wherein a Fast Fourier Transform (FFT), a frequency domain amplitude phase weighting, and an Inverse Fast Fourier Transform (IFFT) are used for filtration when the adaptive equalization is performed in the frequency domain.

6. The transceiver according to claim 5, wherein the adaptive equalization is performed on a combined multi-carrier or on each carrier when the receiver and the interference receiver are multi-carrier receivers.

7. The transceiver according to claim 5, wherein the interference receiver and the receiver employ the same frequency mixing structure and the same frequency mixing local oscillation.

8. The transceiver according to claim 5, wherein the interference receiver is configured to perform an amplification, an analog-digital conversion, and at least one of a frequency conversion, a digital filtration, and a decimation on the received signal.

9. The transceiver according to claim 5, wherein the interference receiver is configured to couple $1/100$ to $1/100,000$ of a total power of the radio frequency signal output from the transmitter.

* * * * *